Nov. 14, 1967 K. ABEL 3,353,031

LOW NOISE LEVEL SHORT WAVE AMPLIFICATION
EMPLOYING A REACTANCE MODULATOR

Filed June 3, 1960 3 Sheets-Sheet 1

United States Patent Office 3,353,031
Patented Nov. 14, 1967

3,353,031
LOW NOISE LEVEL SHORT WAVE AMPLIFICATION EMPLOYING A REACTANCE MODULATOR

Konrad Abel, Munich, Germany, assignor to Siemens & Halske Aktiengesellschaft, Berlin and Munich, Germany, a corporation of Germany Filed June 3, 1960, Ser. No. 33,838
Claims priority, application Germany, June 11, 1959, S 63,416
1 Claim. (Cl. 307—88.3)

This invention is concerned with an arrangement for low noise level amplification of short and ultra short electromagnetic waves employing a reactance modulator to which are conducted the energy of an input signal as well as the energy of a pump oscillator.

Amplifiers of the above noted kind which are known, for example, from Proceedings of the IRE, June 1958, pages 1301–1303, comprise a modulator with a non-linear reactance, for example, a non-linear capacitance to which are conducted the wave which is to be amplified and also a superimposing oscillation of higher frequency. Owing to the non-linear properties of the reactance, for example, a crystal diode operated in blocking range and acting as a capacitance, there appear side bands lying above and below the superimposed frequency. Such a reactance modulator has until now been employed in circuits providing for conducting to its input the oscillations which are to be amplified and also the energy of a pump oscillator, and connnecting to the output a so-called idler. At the input of the reactance modulator there will then appear a negative resistance which can also be understood as constituting a situation in which an amplified wave can be obtained from the reactance modulator input. This amplified wave is in practice separated from the supplied signal wave by connecting to the input a circulator.

Another circuit arrangement with a reactance modulator provides for conducting to the input thereof the signal voltage which is to be amplified and supplying to the modulator in customary manner the energy of a pump oscillator. At the output of the modulator is then obtained the amplified side band corresponding to the difference frequency of the pump frequency and the input signal frequency.

It is in these two kinds of circuits of disadvantage that the frequency of the pump oscillator must lie above the frequency of the input signal oscillation.

In order to counteract this drawback, it has been the practice to operate with arrangements having a charge curve with cubic characteristic. When a reactance modulator with such a characteristic is supplied from an oscillator with oscillations lying below the input signal frequency, the harmonics of this oscillator oscillation can lie above the input signal frequency and can serve as pump frequency.

The pump frequency can also be formed as the sum of two oscillator frequencies. This has been realized until now by conducting to the reactance modulator two oscillations from which is formed, in the reactance modulator, the sum frequency. The corresponding circuit arrangement has been used by conducting to the input of the reactance modulator the input signal oscillation and connecting to the modulator output an idler tuned to the difference from the sum frequency of the two oscillators and the input signal frequency. The entire arrangement accordingly operates as the previously mentioned amplifier based upon the negative input resistance. The fact that the cubic characteristic curve of the reactance modulator is indispensible constitutes a drawback of this known arrangement.

The object of the invention is to show a way which makes it possible to meet all these difficulties in simple manner.

According to the invention, this object is realized by the provision of an arrangement for low noise level amplification of short and ultra short electromagnetic waves, comprising a reactance modulator to which are conducted the energy of an input signal as well as the energy of a pump oscillator, the frequency of said pump oscillator being lower than that of the input signal, and constructing the output of the reactance modulator so that the lower side band and the mirror wave can be separately influenced for further ohmic utilization.

There are two possibilities for utilizing the arrangement according to the invention, namely, first, providing the reactance modulator with a connection over which the lower side band energy is obtained as the desired oscillation, with means for separately ohmically influencing the mirror wave and, second, providing the reactance modulator with a connection resistive component which affects only the lower side band, while utilizing the input for the signal oscillations as an output for the amplified signal oscillations. In the latter arrangement, the separation of the signal oscillations conducted to the reactance modulator and the amplified signal, is suitably effected by means of a circulator. It is moreover advisable to make the output of the reactance modulator independently adjustable with respect to the effective conductance value for utiiization of the lower side band and the mirror wave. It is also of advantage to select the effective resistive component of the output impedance, connected to the output of the reactance modulator, so as to produce with given band width maximum amplification. An arrangement or a bridge arrangement has been found suitable for the separation, preferably of the mirror wave. The terminal impedance may be common for the separation, preferably of the mirror wave, and for a further wave, and may be connected to the output of the reactance modulator with interposition of frequency selective transformation means for one of the respective waves. It is to be assumed that the characteristic charge curve of the reactance modulator has in all such arrangements, in the working range, at least an approximately quadratic course.

The various objects and features of the invention will appear from the description which will be rendered below with reference to the accompanying drawings showing embodiments partly in schematic manner while showing features which are essential more in detail.

Figures 1, 2, 5:
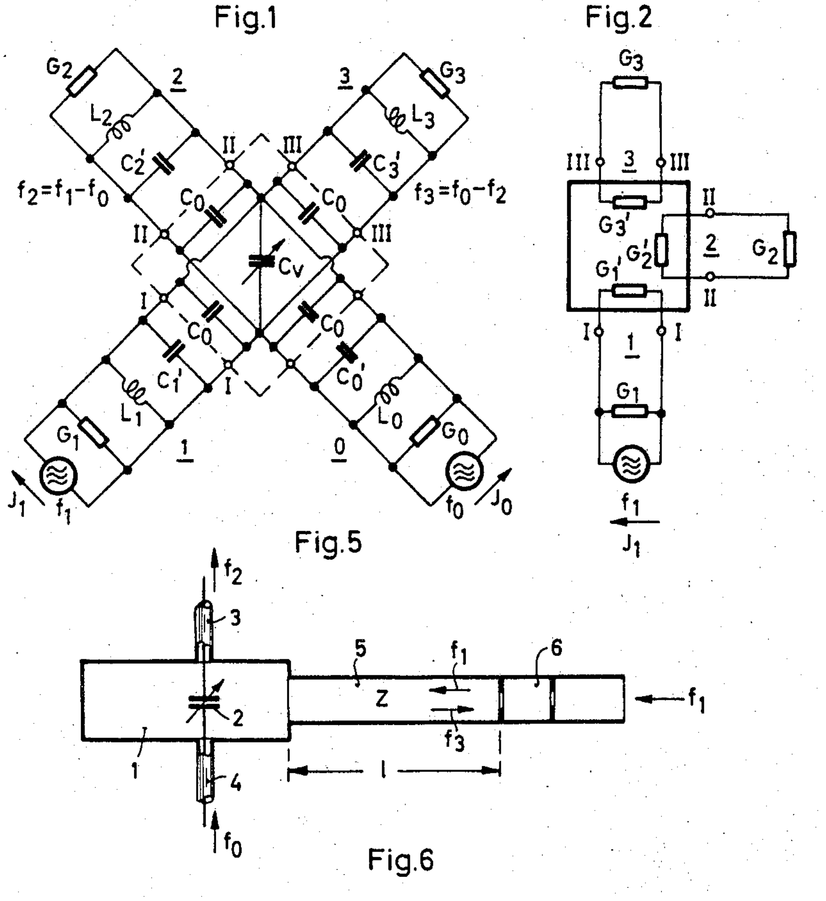
FIG. 1 shows the analog or electrical equivalence circuit of a parametric amplifier with non-linear capacitance as non-linear reactance on which the discussion of the invention is based.
FIG. 2 is a simplified equivalence circuit.
FIG. 5 represents an example of an embodiment for separating frequencies.

In FIG. 1, $C_O$ and $C_V$ are the electrical values formed by the non-linear capacitance. A distinction is thereby to be observed, according to which $C_O$ is the average capacitance and $C_V$ the alteration of the average capacitance caused by the alternating voltages. In the polynome which describes the characteristic capacitance curve, $C_O$ accordingly corresponds to the constant initial member while $C_V$ is determined by the quadratic member of such polynome. The non-linear reactance is in the substitution circuit for the sake of clarity outlined by dash lines. To this non-linear reactance are connected four branches 0, 1, 2 and 3 in parallel circuit.

The branch 0 serves for the connection of the energy of the pump oscillator with the frequency $f_0$, consisting of the generator conductance value $G_O$ and the current source $J_O$. The branch 1 serves for the connection of the energy of the signal source with the frequency $f_1$. The signal source consists of the generator conductance value $G_1$ and the signal current source $J_1$. $L_O$, $C_O$ and $L_1$, $C_1$ are the input circuits for the oscillator frequency and for the signal frequency connected to the respective branches. The branch 2 represents the output impedance of the reactance modulator, which is offered to the lower side band ($f_2=f_1-f_0$), and branch 3 is the output impedance which is being offered to the mirror wave ($f_3=f_0-f_2$). Each of these branches includes a circuit L, C serving for tuning out the reactive component, and an effective conductance value G, such elements appearing in FIG. 1 indexed in accordance with the respective branch designation. It is assumed in the further discussion that there are provided means for assuring that the energy present in each branch has the frequency intended therefor. This means, in other words, that no one of the four branches shall disturb the remaining three branches.

The behavior of such an arrangement may be described as follows: The consequence of the effective conductance value $G_3$ in the branch 3 is that an input impedance appears at the input terminals I of the parametric amplifier, to which $G_3$ contributes a negative effective conductance value as a part thereof. A desired positive or negative effective conductance value may be compelled to appear as an input conductance value by selection of $G_2$ and $G_3$ at the input terminals I. The amplification of the arrangement represented in the substitution circuit can be influenced as described below, assuming utilization of a substitution circuit according to FIG. 2, in which $G'_1$, $G'_2$, $G'_3$ indicate the input impedances of the parametric amplifier as seen from the respective terminals. The equivalence circuit is simplified by omission of the branch 0 for the connection of the oscillator energy and by considering only the effective conductance values of the respective input impedances. The following relations between the individual effective conductance values may be ascertained:

$$G'_1/G_1=\frac{m_{12}}{1-m_{23}}$$

$$m_{12}=\frac{\omega_1\cdot\omega_2\cdot C_V^2}{G_1\cdot G_2}$$

$$m_{23}=\frac{\omega_2\cdot\omega_3\cdot C_V^2}{G_2\cdot G_3}$$

wherein $C_V$ is the previously mentioned constant of the quadratic characteristic charge curve. If $V_{12}$ designates the output amplification from the signal input 1 to the output 2, there will result $$V_{12}=\frac{f_2\cdot 4\cdot m_{12}}{f_1\cdot(1+m_{12}-m_{23})^2}$$

Figure 3:
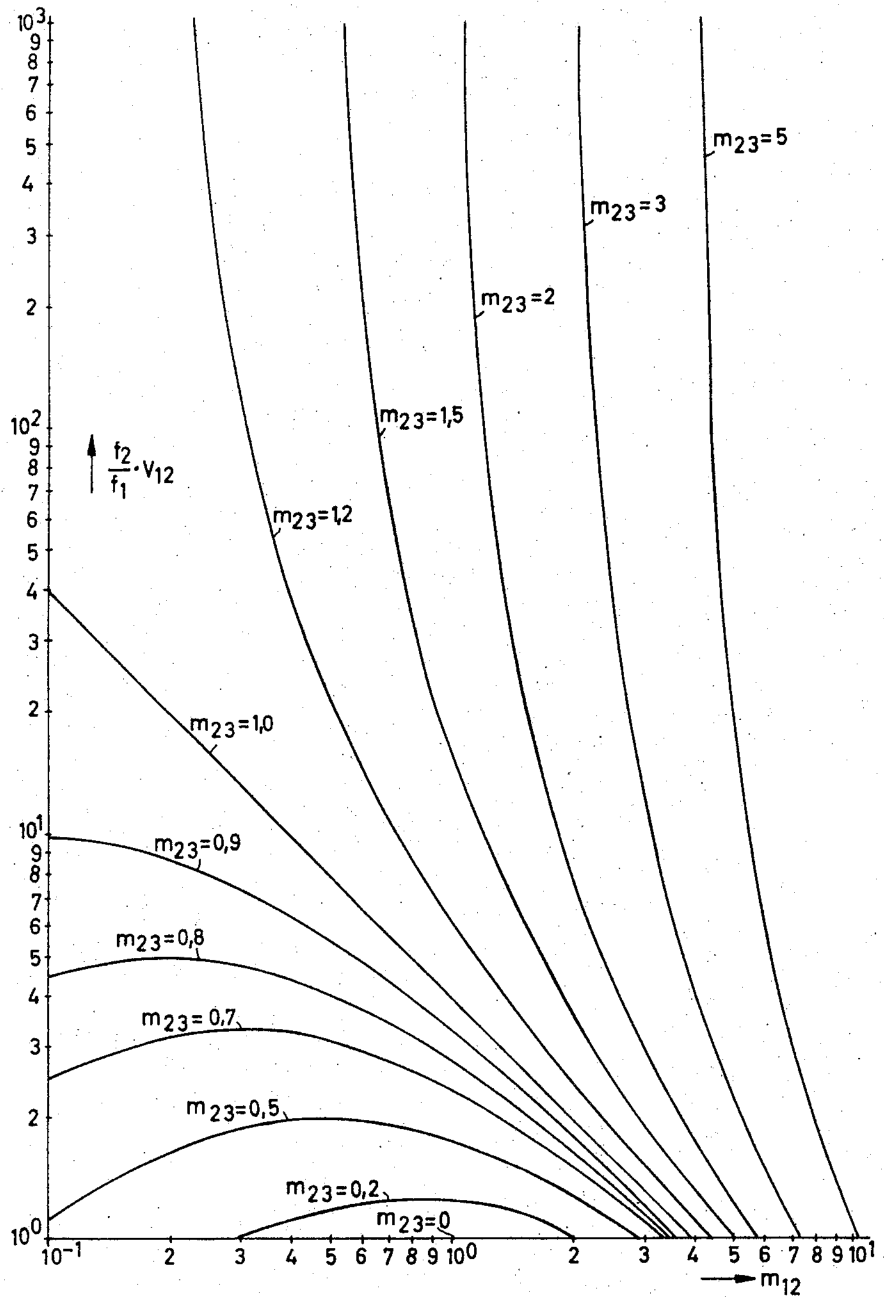
FIG. 3 illustrates the operation of the arrangement responsive to connection of the input signal to the reactance modulator and withdrawal of the working oscillation at a branch circuit connected thereto.

As will be seen from the equation for $G'_1/G_1$, the input conductance value can be adjusted positively or negatively according to a predetermined value, by selection of $m_{23}$ and therewith selection of $G_2$ or $G_3$. The operations or, rather to say, the electrical characteristics, of the arrangement, upon connection of the input signal to the terminals 1 and withdrawal of the effective working oscillations in the branch 2, which is described by the equation for $V_{12}$, is illustrated in FIG. 3.

If $G_3$ is in accordance with the known case infinite (short circuit), the amplification of the parametric amplifier will with matching correspond to the ratio of $f_2$ to $f_1$.

In the case of mis-matching, the amplification will be lower. However, when an essential finite value is provided, the amplification will be greater than would correspond to the pure frequency ratio of $f_2$ to $f_1$. From the equations may be derived the general rule, namely, that the amplification will be higher the more $G_3$ participates in the energy consumption. For a given essential $G_3$, the amplification will moreover be the higher the lower $G_2$. Appropriate selection of $G_2$ and $G_3$ therefore makes it possible to realize in stable condition a predetermined amplification value. The stability requirement for such an amplifier is that $m_{12}-m_{23}$ must be greater than $-1$. In FIG. 3, the value $m_{12}$ is plotted on the abscissa and the value $f_2\cdot V_{12}/f_1$ is plotted on the ordinate. The value $m_{23}$ is selected as parameter. The value designated by $m_{23}=0$ corresponds to the known case in which $G_3$=infinite and wherein the amplification depends accordingly only upon the ratio of $f_2$ to $f_1$.

In the case of amplification based upon a negative resistance, in which the input for the signal voltage which is to be amplified constitutes also the output for the amplified signal voltage, there will be obtained for the output amplification $V_{11}$ of the signal to be amplified $$V_{11}=\left(\frac{1-m_{12}-m_{23}}{1+m_{12}-m_{23}}\right)^2$$

Figure 4:
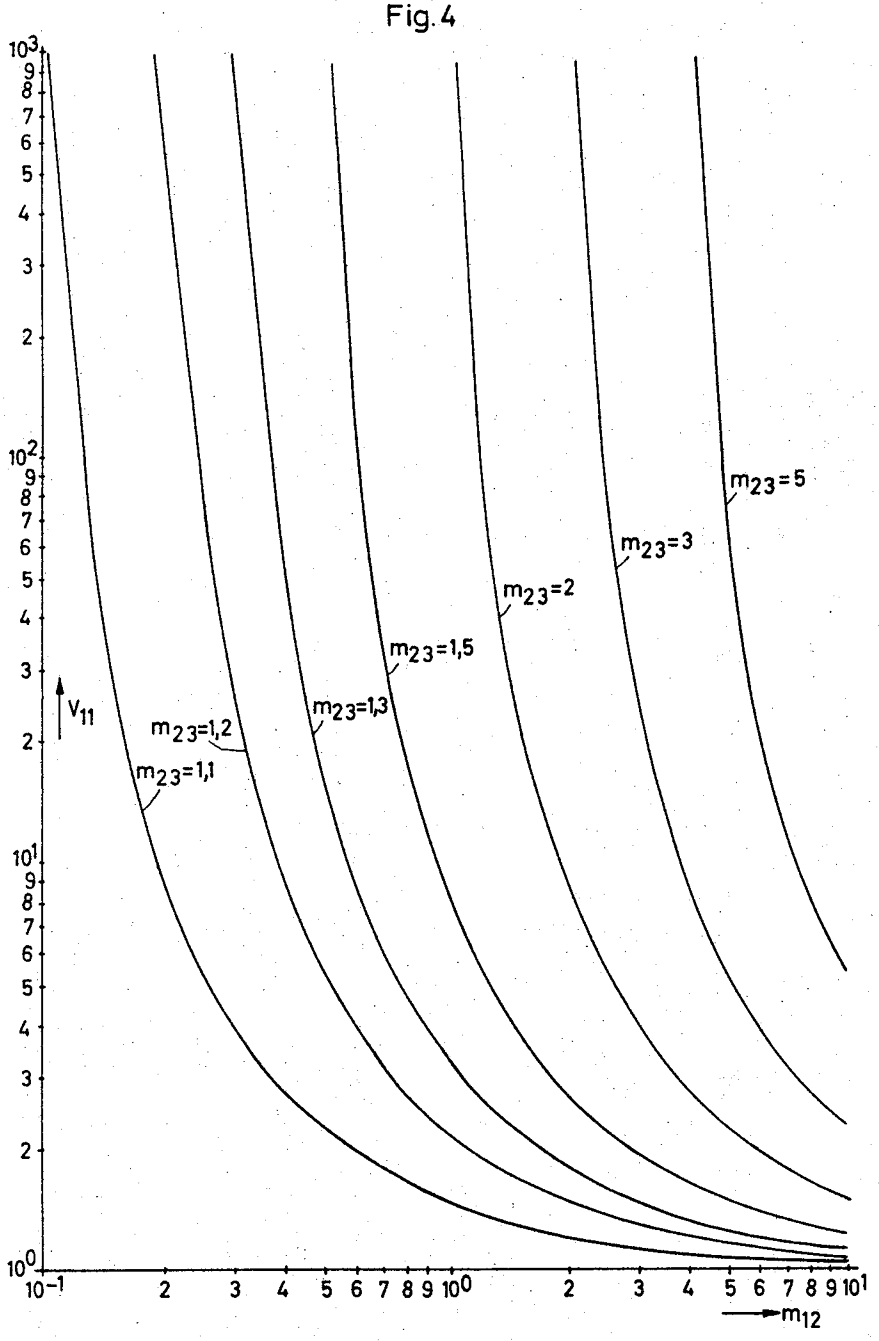
FIG. 4 shows the operation of the arrangement in the case of amplification based upon a negative resistance, in which the input for the signal voltage which is to be amplified constitutes also the output for the amplified signal voltage.

The stability requirement is in this case the same as in the previously explained case. The operation or behavior of the parametric amplifier circuited in this manner is illustrated in FIG. 4. The value $m_{12}$ is plotted on the abscissa and the value $V_{11}$ on the ordinate. The value $m_{23}$ serves in this case as parameter. An amplification is obtained when $m_{23}$ is greater than $m_{12}$ and smaller than $m_{12}+1$.

It shall now be explained by way of example, how the separation of the frequencies can be carried out in practice. It is to be observed thereby that $f_1$, $f_2$ and $f_3$ are not to be merely individual frequencies, but that the signals with the frequencies $f_2$ and $f_3$ have finite band width owing to the finite band width of the signal with the frequency $f_1$.

Upon down-conversion, the frequency of the lower side band will as a rule lie relatively low, while the mirror wave will lie as to frequency in the order of magnitude of the oscillator or input signal wave. Particular difficulties appear in such case with respect to the separation of the mirror wave from the input signal or the oscillator, respectively.

In the case to be now described, it is assumed that the oscillator is in very frequency selective manner coupled to the reactance modulator and that it may therefore be ignored, and that the main difficulty lies in the separation of the mirror wave from the input signal wave.

In the embodiment shown in FIG. 5, which is adapted for this purpose, there is provided a frequency selective transformation member for the separation of the input signal wave and the mirror wave. The arrangement comprises, disposed between opposite wall portions of a wave guide 1 of, for example, cross-sectionally rectangular configuration, a crystal diode 2, which is connected, as calculated from the short circuiting point, in electrical spacing amounting to one fourth of the wave guide wave length, such crystal diode serving as a non-linear capacitance. The crystal diode is provided with two lead-in means for coaxial lines 3 and 4, which make it in a kind of series feed possible to extend the oscillator frequency $f_0$ and to obtain the lower side band with the center frequency $f_2$. A transformation member 5 extends from the open end of the wave guide, followed by a band filter 6 which is permeable to the input signal frequency $f_1$ but blocks the mirror wave with the frequency $f_3$. The frequency selective transformation member 5 is with respect to its electrical length, its cross-sectional dimensions and its wave impedance, so dimensioned, that it transforms the input impedance of the band filter 6, appearing in the mirror wave, to a predetermined effective conductance value in the cross-sectional plane of the crystal diode 2, while providing matching for the input signal wave.

Figure 6:
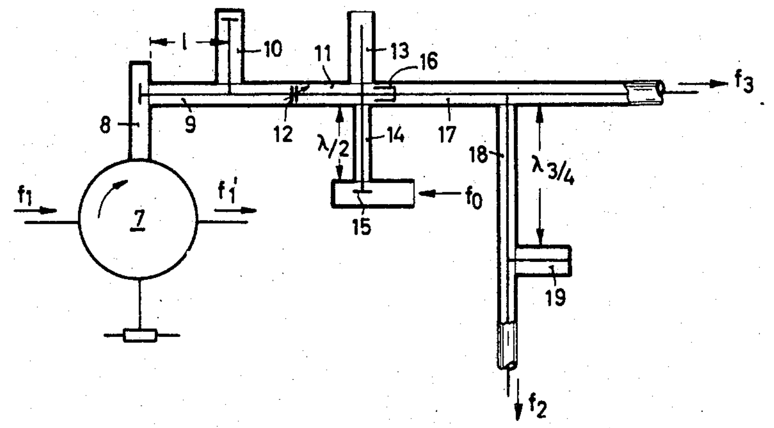
FIG. 6 shows an example of an embodiment to aid in explaining the amplification of a parametric amplifier.

FIG. 6 shows an example to aid in explaining the utilization of the parametric amplifier for amplification similar to a negative resistance.

It is thereby assumed that the input signal frequency $f_1$ and the frequency $f_0$ of the pump oscillator are, for the frequency selection, so selected, one with respect to the other, that the mirror wave $f_3$ lies relatively close to the lower side band $f_2$. The input signal frequency $f_1$ is fed into a circular 7 to the first output of which is connected a wave guide 8, such wave guide having a limit wave length which permits only the transmission of the input signal wave $f_1$. The wave guide 8 is provided with a coupling probe which extends into a coaxial line 9. The electrical length $l$ of this coaxial line is so great that the idling appears at the location of the coupling probe for the frequencies $f_2$ and $f_3$, as short circuit at the connecting point of a stub line filter 10. This stub line filter prevents propagation of energy of the pump oscillator with the frequency $f_0$, beyond the coaxial line 9 into the wave guide 8. A coaxial line section 11 extends from the coaxial line 9, such section containing the non-linear reactance, for example, a crystal diode in series connection with the inner conductor thereof. At the end of the coaxial line 11 facing away from the resonance circuit 10, there is connected a further coaxial line resonator 13 which is in its electrical length so dimensioned that a short circuit is formed, for the input signal frequency $f_1$, at its connecting point between the inner conductor and the outer conductor of the coaxial line 11. From the connecting point of this circuit 13 there extends a branching off over a coaxial line 14 and a coupling probe 15 to a coaxial line serving for connection of the oscillator oscillation with the frequency $f_0$. The coaxial line 14 has an electrical length of one half wave length for a frequency lying between the frequencies $f_2$ and $f_3$. From the branching off point also extends a coaxial line 17 to the separation of $f_2$ and $f_3$. There is additionally provided a resonance choke 16 forming a barrier for the oscillator frequency $f_0$. The coaxial line 17 extends to the branch off point for the frequency $f_3$. At the branch off point is disposed a coaxial line 18, in parallel circuit, for obtaining the energy of the lower side band with the center frequency $f_2$. Inserted into the coaxial line 18 is a stub line filter 19 which is disposed at the frequency $f_3$ in electrical spacing of one quarter of the operating wave length from the connecting point. The stub line filter 19 produces at its connecting point in the coaxial line 18 a short circuit for the freqnency $f_3$ and therewith an idling at the connecting point of the coaxial line 18 to the coaxial line 17. It is accordingly possible to treat the individual energy components in the described manner, by the use of absorber or further filter means.

The coaxial line 17 in the embodiment according to FIG. 6 can also be provided with a common termination for the frequencies $f_2$ and $f_3$. It is in such cases advisable to construct and to dimension the line 17 as to its electrical length and wave impedance, so as to provide in such direction for a wide band. This is similar to the case in which $G_2$ and $G_3$ are in the previously noted equations of the same value. A transformation quad is in such case to be connected between the output of the circulator 7, to which is connected the wave guide 8, and the non-linear reactance 12, such transformation quad transforming the input impedance $G_1$ for the input signal frequency $f_1$ so as to produce the required amplification. The relations for the selection of this reactance are apparent from the previously noted equations. It is in practice desirable to dispose such transformation member directly in the wave guide 8 since it could otherwise disturb the transformation conditions, in the coaxial lines 9 and 11, for the remaining waves. Conditions can also be produced by means of bridge circuits.

Changes may be made within the scope and spirit of the appended claim which defines what is believed to be new and desired to have protected by Letters Patent.

I claim:

An arrangement for low noise level amplification of short and ultra short electromagnetic waves, comprising a reactance modulator having output means containing a first terminal impedance for the mirror wave which comprises the effective working oscillation and a second terminal impedance for the lower sideband, said second terminal impedance being with respect to its effective component operatively independent of said first terminal impedance, a pump oscillator, means for conducting to said modulator the energy of an input signal and also the energy of the pump oscillator the frequency of which is lower than that of the input signal, said reactance modulator being provided with an output utilizing the lower sideband oscillation, making it possible to effect separately thereof an influencing of the mirror wave by an ohmic load.

References Cited

UNITED STATES PATENTS

| | | | |
|---|---|---|---|
| 2,970,275 | 1/1961 | Kurzork | 330—5 |
| 3,012,203 | 12/1961 | Tien | 330—4.6 |

FOREIGN PATENTS

| | | |
|---|---|---|
| 1,073,557 | 1/1960 | Germany. |

OTHER REFERENCES

Chang et al.; "1958 IRE WESCON Convention Record—Part 3," pp. 23–27 (copy in Scientific Library).

Hogan et al.; "Journal of Applied Physics," March 1958, pp. 422–423 (copy in Scientific Library).

Reed; "IRE Transactions on Electron Devices," April 1959, pp. 216–224 (copy in Scientific Library).

Vartanian et al.; "IRE WESCON Convention Record—Part 1," pp. 52–57 (copy in Scientific Library).

Younger et al.; "Proceedings of the IRE," July 1959, pp. 1271–1272 (copy in Scientific Library).

ROY LAKE, *Primary Examiner.*

E. JAMES SAX, ARTHUR GAUSS, *Examiners.*

D. R. HOSTETTER, *Assistant Examiner.*